(12) United States Patent
Weinberg et al.

(10) Patent No.: US 12,744,760 B2
(45) Date of Patent: Sep. 22, 2026

(54) SYSTEM AND METHOD FOR SECURING COMMUNICATION AND INFORMATION OF MOBILE DEVICES THROUGH A CONTROLLED CELLULAR COMMUNICATION NETWORK

(71) Applicant: FirstPoint Mobile Guard Ltd., Netanya (IL)

(72) Inventors: Adam Weinberg, Netanya (IL); Frank Kleinewoerdemann, Givatayim (IL)

(73) Assignee: FIRSTPOINT MOBILE GUARD LTD., Netanya (IL)

( * ) Notice: Subject to any disclaimer, the term of this patent is extended or adjusted under 35 U.S.C. 154(b) by 406 days.

(21) Appl. No.: 18/554,050

(22) PCT Filed: Apr. 5, 2022

(86) PCT No.: PCT/IL2022/050355
§ 371 (c)(1),
(2) Date: Oct. 5, 2023

(87) PCT Pub. No.: WO2022/215070
PCT Pub. Date: Oct. 13, 2022

(65) Prior Publication Data

US 2024/0372834 A1 Nov. 7, 2024

Related U.S. Application Data

(60) Provisional application No. 63/171,286, filed on Apr. 6, 2021.

(51) Int. Cl.

| | |
|---|---|
| ***H04L 61/4511*** | (2022.01) |
| ***H04L 9/40*** | (2022.01) |
| ***H04W 8/18*** | (2009.01) |

(52) U.S. Cl.
CPC ...... *H04L 63/0263* (2013.01); *H04L 61/4511* (2022.05); *H04W 8/186* (2013.01)

(58) Field of Classification Search
CPC ............. H04L 63/0263; H04L 61/4511; H04L 63/0254; H04L 63/1441; H04L 67/306; H04L 9/40; H04W 8/186; H04W 12/088
(Continued)

(56) References Cited

U.S. PATENT DOCUMENTS

| | | | | |
|---|---|---|---|---|
| 11,153,350 B2 * | 10/2021 | Di Mattia | ........... | H04L 63/1441 |
| 12,093,837 B2 * | 9/2024 | Zhou | ...................... | G06N 3/082 |

(Continued)

FOREIGN PATENT DOCUMENTS

| | | | | |
|---|---|---|---|---|
| CA | 2873900 A1 * | 11/2013 | ......... | H04L 12/1435 |
| WO | 2018231855 A1 | 12/2018 | | |

*Primary Examiner* — Khanh Q Dinh
(74) *Attorney, Agent, or Firm* — FisherBroyles, LLP; Roger L. Browdy; James E. Mrose

(57) ABSTRACT

The present invention provides a method for securing the data communication of cellular network subscribers using a security service, comprising: —associating subscribers listed to the security service with a group. —wherein the group association for each subscriber is determined a-priory, based on the identity of the subscriber, or dynamically, based on the communication pattern of the subscriber; —Configuring the cellular network connectivity to the public PDN with security GW, the data flow of the subscriber's service is routed through the security GW; —applying plurality security rules comprising group related rules and individual related rules associated with by the security GW; wherein plurality of the security rules applied in the security GW are implemented in two layers: a first layer is determined by the individual identity of the subscriber and a second layer is based on the group to which the subscriber is associated.

22 Claims, 14 Drawing Sheets

(58) Field of Classification Search
USPC .......................................... 709/220, 224–229
See application file for complete search history.

(56) References Cited

U.S. PATENT DOCUMENTS

| | | | | |
|---|---|---|---|---|
| 12,456,070 | B2 * | 10/2025 | Phan | G06N 5/01 |
| 2008/0282338 | A1 | 11/2008 | Beer | |
| 2016/0218977 | A1 * | 7/2016 | Lapidous | H04L 12/4641 |
| 2016/0218978 | A1 * | 7/2016 | Lapidous | H04L 67/563 |
| 2016/0219013 | A1 * | 7/2016 | Lapidous | H04L 63/0272 |
| 2016/0245813 | A1 * | 8/2016 | Mir | G01N 33/57515 |
| 2017/0374548 | A1 * | 12/2017 | Mason | H04L 63/062 |
| 2018/0167413 | A1 * | 6/2018 | Raleigh | H04W 12/03 |
| 2018/0367569 | A1 | 12/2018 | Verma et al. | |
| 2019/0003867 | A1 * | 1/2019 | Singer | G01F 15/18 |
| 2019/0261172 | A1 | 8/2019 | Weinberg et al. | |
| 2019/0306200 | A1 | 10/2019 | Schwartz et al. | |
| 2019/0387399 | A1 | 12/2019 | Weinberg et al. | |
| 2020/0007548 | A1 * | 1/2020 | Sanghavi | H04L 63/0236 |
| 2020/0162994 | A1 * | 5/2020 | Jayawardena | H04W 40/02 |
| 2020/0314065 | A1 * | 10/2020 | Roy | H04L 63/0209 |
| 2022/0103525 | A1 * | 3/2022 | Shribman | G06F 16/9574 |
| 2025/0016077 | A1 * | 1/2025 | Wang | H04L 67/10 |
| 2025/0037008 | A1 * | 1/2025 | Mara | G06F 16/20 |
| 2025/0150458 | A1 * | 5/2025 | Sengupta | H04L 63/105 |
| 2025/0348560 | A1 * | 11/2025 | Blair | G06F 21/106 |

* cited by examiner

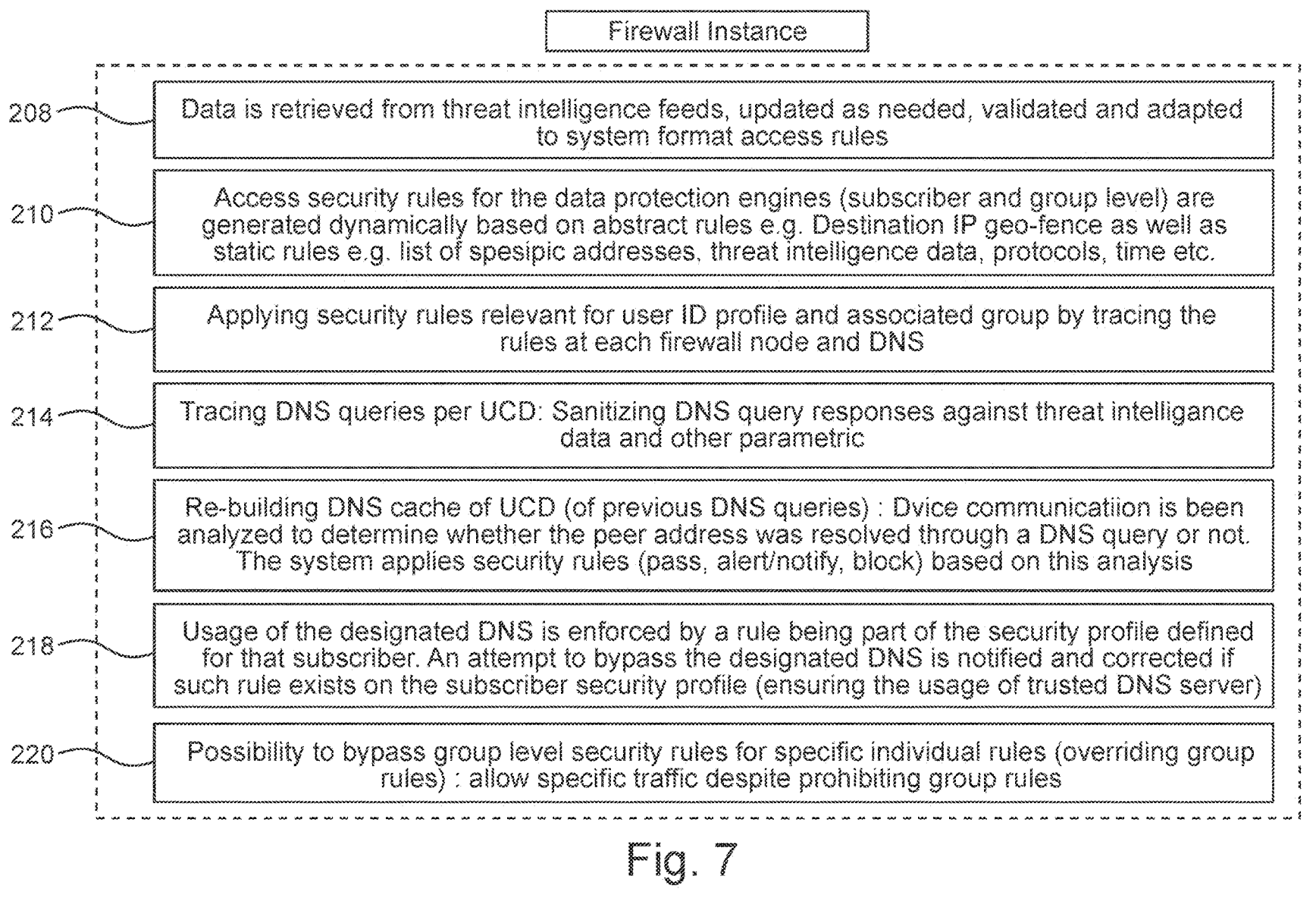

Firewall Instance

208 Data is retrieved from threat intelligence feeds, updated as needed, validated and adapted to system format access rules 210 Access security rules for the data protection engines (subscriber and group level) are generated dynamically based on abstract rules e.g. Destination IP geo-fence as well as static rules e.g. list of spesipic addresses, threat intelligence data, protocols, time etc.

212 Applying security rules relevant for user ID profile and associated group by tracing the rules at each firewall node and DNS 214 Tracing DNS queries per UCD: Sanitizing DNS query responses against threat intelligance data and other parametric 216 Re-building DNS cache of UCD (of previous DNS queries) : Dvice communicatiion is been analyzed to determine whether the peer address was resolved through a DNS query or not. The system applies security rules (pass, alert/notify, block) based on this analysis 218 Usage of the designated DNS is enforced by a rule being part of the security profile defined for that subscriber. An attempt to bypass the designated DNS is notified and corrected if such rule exists on the subscriber security profile (ensuring the usage of trusted DNS server)

220 Possibility to bypass group level security rules for specific individual rules (overriding group rules) : allow specific traffic despite prohibiting group rules

Fig. 7

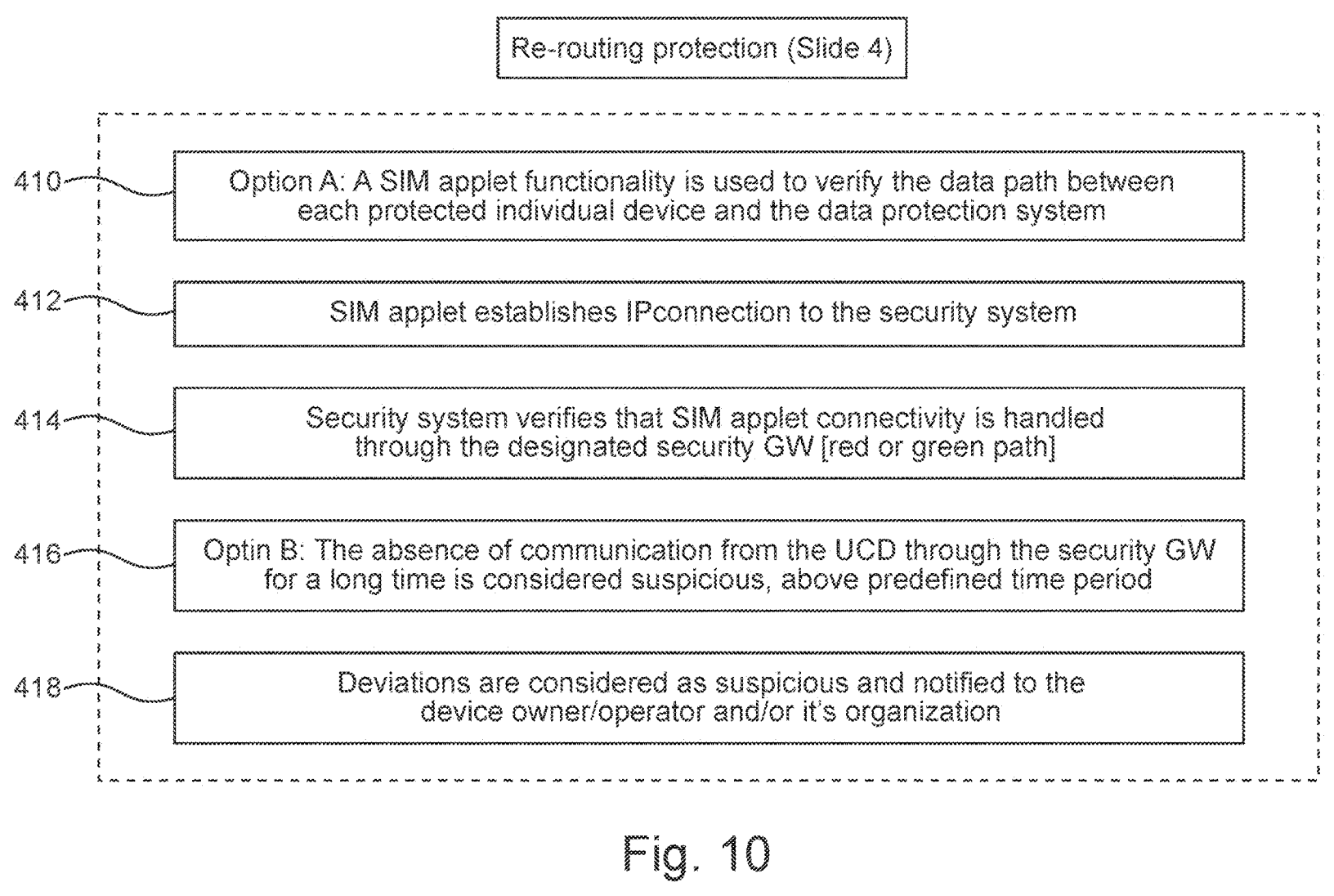

Re-routing protection (Slide 4)

410 Option A: A SIM applet functionality is used to verify the data path between each protected individual device and the data protection system 412 SIM applet establishes IPconnection to the security system 414 Security system verifies that SIM applet connectivity is handled through the designated security GW [red or green path]

416 Optin B: The absence of communication from the UCD through the security GW for a long time is considered suspicious, above predefined time period 418 Deviations are considered as suspicious and notified to the device owner/operator and/or it's organization

Fig. 10

SYSTEM AND METHOD FOR SECURING COMMUNICATION AND INFORMATION OF MOBILE DEVICES THROUGH A CONTROLLED CELLULAR COMMUNICATION NETWORK

FIELD OF THE INVENTION

The present invention generally relates to the field of cellular networks. More specifically, it addresses issues of communication and data security and privacy over cellular networks.

BACKGROUND OF THE INVENTION

The abundance and diversity of threats to security and privacy over cellular networks is a well-established fact. Perpetrators may tap into various sources of data that are either stored on or communicated with any cellular device. For example, they may violate the privacy of cellular network subscribers by gaining access to stored files and private information, remotely operating the cellular device's camera and microphone, implanting malicious software, and even obtaining knowledge of their physical whereabouts.

Mobile phones as well as other portable devices that are employed for business use typically possess a wide variety of communication interfaces, each of which is vulnerable to cyber-attacks. Examples for such interfaces are:

- Voice calls;
- Text messages;
- Private emails and company emails;
- Private apps, and company apps;
- Access to company databases, business calendars and customer data; and
- Any type of media Attackers may choose to hack data pertaining to a cellular subscriber through a variety of methods. Examples for such methods include:

- International Mobile Subscriber Identity (IMSI) catcher;
- Man-in-the-middle (MitM) attacks;
- Network attacks, e.g. by exploiting Signaling System 7 (SS7) loopholes; and
- Different types of social engineering methods, for the purpose of information gathering, fraud, or gaining system access.

Attackers may choose to interface the target User Cellular Device (UCD) through a variety of access points, e.g. through the cellular network, Wi-Fi, Bluetooth or a USB connection.

Attackers may choose to target 'ordinary' cellular network interfacing devices (e.g. smartphones, tablets and laptop computers) as well as Internet of Things (IoT) devices, such as Machine to Machine (M2M) and connected cars.

Attackers may choose to target personal information stored on cellular devices (e.g. passwords), in order to ultimately target data that is stored elsewhere (e.g. email or drop-box accounts).

Prior art includes tools that provide some degree of security by monitoring the activity on the UCD from the end-users' perspective, such as various anti-malware software tools. Such tools are limited in their scope of response to threats:

- They require installation of the security tool on the UCD, and rely on updates from external sources;
- They do not relate to threats posed to the UCD from the cellular network's perspective; and
- They do not control the interaction of cellular subscribers with the hosting network.

Some network security solutions (e.g. US2016226913: "Technologies For Scalable Security Architecture Of Virtualized Network" and US20160308837: "Methods And Apparatus To Configure Virtual Private Mobile Networks For Security") disclose methods for securing the functionality of modules of the cellular network, but do not directly address UCD data security and the privacy of cellular network subscribers.

The disclosed invention addresses the issue of cellular security in a comprehensive perspective, addressing threats of multiple categories and sources, from both the UCD's and the network's perspective.

SUMMARY OF THE INVENTION

The present invention provides A method for securing the data communication of cellular network subscribers using a security service, said method comprising:

- associating subscribers listed to the security service with a group. wherein the group association for each subscriber is determined a-priory, based on the identity of the subscriber, or dynamically, based on the communication pattern of the subscriber;
- Configuring the cellular network connectivity to the public PDN with at least one security GW, such that data flow of the subscribers listed to the security service is routed through the at least one security GW;
- applying plurality security rules comprising group related rules and individual related rules associated with by at least one the security GW, wherein the security rules are configured for inspecting the data communication and determining if to block or allow the data communication;
- wherein plurality of the security rules applied in the security GW are implemented in two layers: a first layer which is determined by the individual identity of the subscriber and a second layer which is based on the group to which the subscriber is associated.
- Wherein the Security rules applied at the group layer are bypassed for specific individual rules;
- applying the plurality of security rules relevant for user ID profile and associated group by tracing the rules at each firewall nodes According to some embodiments of the present invention the group are determined based on at least one of, device type specific, usage type specific, device owner specific;

- wherein the security rules are implemented on virtualized computing entities (containers) in a swarm deployment of firewalls nodes;
- wherein the mobile subscriber address is assigned by the system upon network connection, wherein a routing path through the container swarm (individual and group level) is established upon address assignment.
- wherein the security profiles defined for the subscriber and its group are applied to the firewall nodes along the routing path and applied to data traversing in either direction along that path.
- wherein the security associated with group and/or individual rules for the data protection engines (subscriber/individual and group level) are generated dynamically based on abstract rules including at least one of destination IP geo-fence, and/or static rules including at least one of list of specific addresses, protocols, time.

According to some embodiments of the present invention the security GW is connected to feeds of threat intelligence providers wherein the data retrieved from the feeds are validated and adapted to the system format, wherein the threat intelligence feed source can be selected on individual and as well as group level.

According to some embodiments of the present invention the DNS based protection is applied by

- supplying DNS services to the protected mobile devices (the devices listed to the protection service).
  - Wherein the usage of the designated DNS is enforced by a rule being part of the security profile defined for that subscriber, such that an attempt to bypass the designated DNS is notified and corrected if such rule exists on the subscriber security profile.

According to some embodiments of the present invention the system rebuilds a DNS cache individually for the subscriber based on the individual DNS traffic analyzed by the system, wherein Device communication is been analyzed passively to determine whether the peer address was resolved through a DNS query or not, wherein the system applies security rules (pass, alert/notify, block) based on this analysis.

According to some embodiments of the present invention wherein the DNS queries are escalated to verified service providers by secure (encrypted) protocol and the DNS query response is sanitized by the system.

According to some embodiments of the present invention the re-routing detection and protection is applied, by using a SIM applet functionality for verifying the data path between each protected individual device and the data protection system, wherein the functionality is achieved by establishing an independent network IP connectivity from the SIM applet to the security system (e.g. BIP connectivity), and verifying that this connectivity is handled through the designated security GW.

According to some embodiments of the present invention the re-routing detection and protection is applied by detecting absence of communication from the subscriber through the security GW for above a predefined time period.

The present invention provides a method for securing the data communication of cellular network subscribers using a security service, said method comprising:

- associating subscribers listed to the security service with a group.
- Configuring the cellular network connectivity to the public PDN with at least one security GW, such that data flow of the subscribers listed to the security service is routed through the at least one security GW;
- applying plurality of security rules comprising group related rules and individual related rules associated with by at least one the security GW,
- wherein the security rules are configured for inspecting the data communication and determining if to block or allow the data communication;
- wherein plurality of the security rules applied in the security GW are implemented in two layers: a first layer which is determined by the individual identity of the subscriber and a second layer which is based on the group to which the subscriber is associated.
- applying the plurality of security rules relevant for user ID profile and associated group by tracing the rules at each firewall nodes.

According to some embodiments of the present invention the group association for subscriber is determined dynamically, based the communication pattern of the subscriber.

According to some embodiments of the present invention the group association per subscriber is determined a-priory based on the identity of the subscriber or device type specific or device owner specific, usage type.

According to some embodiments of the present invention the security rules are implemented on virtualized computing entities (containers) in a swarm deployment of firewalls nodes.

According to some embodiments of the present invention the mobile subscriber address is assigned by the system upon network connection, wherein a routing path through the container swarm (individual and group level) is established upon address assignment.

According to some embodiments of the present invention the security profiles are defined for the subscriber and its group are applied to the firewall nodes along the routing path and applied to data traversing in either direction along that path.

According to some embodiments of the present invention the security rules associated with group and/or individual rules for the data protection engines (subscriber/individual and group level) are generated dynamically based on abstract rules including at least one of destination IP geofence, and/or static rules including at least one of list of specific addresses, protocols, time.

According to some embodiments of the present invention the security GW is connected to feeds of threat intelligence providers wherein the data retrieved from the feeds are validated and adapted to the system format, wherein the threat intelligence feed source can be selected on individual and as well as group level.

According to some embodiments of the present invention the Security rules applied at the group layer are bypassed for specific individual rules;

According to some embodiments of the present invention the DNS based protection is applied by

- supplying DNS services to the devices listed to the protection service ("protected mobile devices").
  - Wherein the usage of the designated DNS is enforced by a rule being part of the security profile defined for that subscriber, such that an attempt to bypass the designated DNS is notified and corrected if such rule exists on the subscriber security profile.

According to some embodiments of the present invention the system rebuilds a DNS cache individually for the subscriber based on the individual DNS traffic analyzed by the system, wherein device communication is been analyzed passively to determine whether the peer address was resolved through a DNS query or not, wherein the system applies security rules including at least one of pass, alert/notify, block.

According to some embodiments of the present invention the DNS queries are escalated to verified service providers by secure (encrypted) protocol and the DNS query response is sanitized by the system.

According to some embodiments of the present invention the re-routing detection and protection is applied, by using a SIM applet functionality for verifying the data path between each protected individual device and the data protection system, wherein the functionality is achieved by establishing an independent network IP connectivity from the SIM applet to the security system (e.g. BIP connectivity), and verifying that this connectivity is handled through the designated security GW.

According to some embodiments of the present invention the re-routing detection and protection is applied by detecting absence of communication from the subscriber through the security GW for above a predefined time period.

The present invention provides a system for securing the data communication of cellular network subscribers using a security service, said system comprised of:

Controller configured for identifying client profile and associated groups Managing the address assigned to each of the UCD and determines personal/customized rules;

at least one security GW for Configuring the cellular network connectivity to the public PDN with, such that data flow of the subscribers listed to the security service is routed through the at least one security GW;

group and personal firewalls for applying plurality of security rules comprising group related rules and individual related rules associated with by at least one the security GW, wherein the security rules are configured for inspecting the data communication and determining if to block or allow the data communication;

wherein plurality of the security rules applied in the security GW are implemented in two layers: a first layer which is determined by the individual identity of the subscriber and a second layer which is based on the group to which the subscriber is associated.

applying the plurality of security rules relevant for user ID profile and associated group by tracing the rules at each firewall nodes.

According to some embodiments of the present invention wherein the group association for subscriber is determined dynamically, based the communication pattern of the subscriber.

According to some embodiments of the present invention the group association per subscriber is determined a-priory based on the identity of the subscriber or device type specific or device owner specific, usage type.

According to some embodiments of the present invention the security rules are implemented on virtualized computing entities (containers) in a swarm deployment of firewalls nodes.

According to some embodiments of the present invention the mobile subscriber address is assigned by the system upon network connection, wherein a routing path through the container swarm (individual and group level) is established upon address assignment.

According to some embodiments of the present invention the security profiles are defined for the subscriber and its group are applied to the firewall nodes along the routing path and applied to data traversing in either direction along that path.

According to some embodiments of the present invention the security rules associated with group and/or individual rules for the data protection engines (subscriber/individual and group level) are generated dynamically based on abstract rules including at least one of destination IP geo-fence, and/or static rules including at least one of list of specific addresses, protocols, time.

According to some embodiments of the present invention the security GW is connected to feeds of threat intelligence providers wherein the data retrieved from the feeds are validated and adapted to the system format, wherein the threat intelligence feed source can be selected on individual and as well as group level.

According to some embodiments of the present invention the DNS based protection is applied by supplying DNS services to the devices listed to the protection service ("protected mobile devices").

Wherein the usage of the designated DNS is enforced by a rule being part of the security profile defined for that subscriber, such that an attempt to bypass the designated DNS is notified and corrected if such rule exists on the subscriber security profile.

According to some embodiments of the present invention the system rebuilds a DNS cache individually for the subscriber based on the individual DNS traffic analyzed by the system, wherein Device communication is been analyzed passively to determine whether the peer address was resolved through a DNS query or not, wherein the system applies security rules including at least one of pass, alert/notify, block).

According to some embodiments of the present invention the DNS queries are escalated to verified service providers by secure (encrypted) protocol and the DNS query response is sanitized by the system.

According to some embodiments of the present invention in which re-routing detection and protection is applied, by using a SIM applet functionality for verifying the data path between each protected individual device and the data protection system, wherein the functionality is achieved by establishing an independent network IP connectivity from the SIM applet to the security system (e.g. BIP connectivity), and verifying that this connectivity is handled through the designated security GW.

According to some embodiments of the present invention the re-routing detection and protection is applied by detecting absence of communication from the subscriber through the security GW for above a predefined time period.

According to some embodiments of the present invention the Security rules applied at the group layer are bypassed for specific individual rules.

BRIEF DESCRIPTION OF THE DRAWINGS

FIG. 7 is a flow diagram of the action performed by the firewall instance, according to some embodiments of the present invention.

FIG. 10 is a flow diagram of re-routing of secured message protection according to the configuration of FIG. 4, according to some embodiments of the present invention.

DETAILED DESCRIPTION OF SOME EMBODIMENTS OF THE INVENTION

Figure 1:
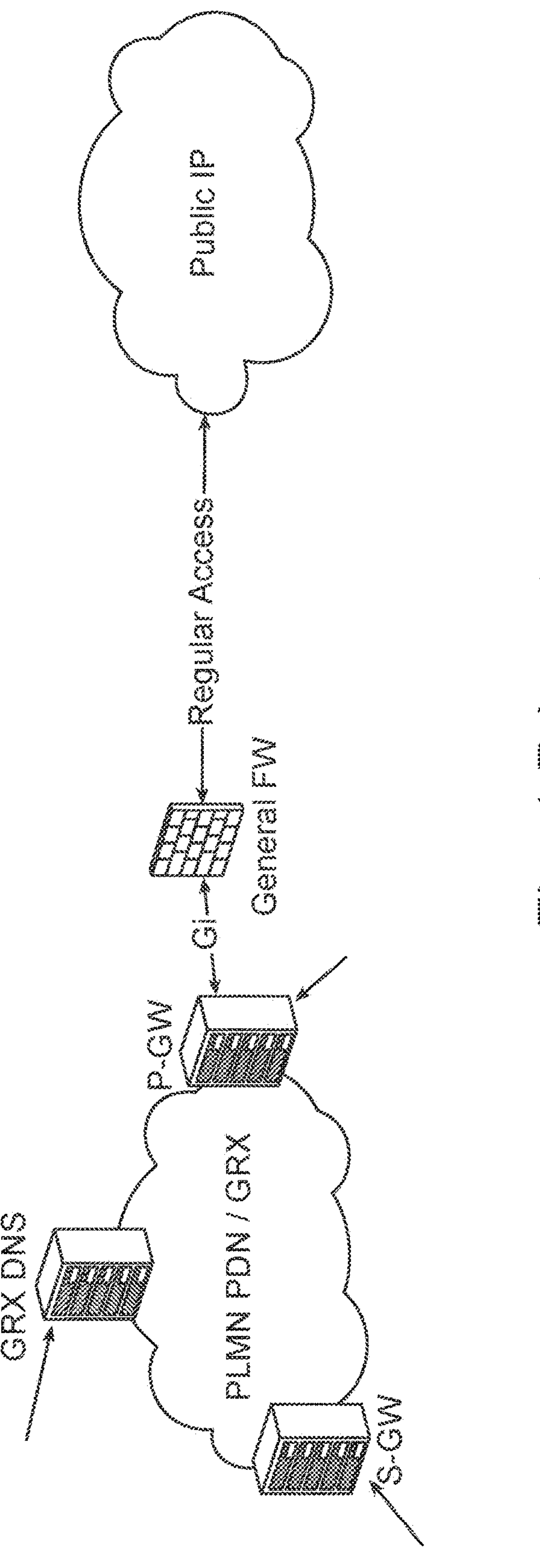
FIG. 1 illustrate a block diagram, depicting the messaging security platform, according to prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application.

| Term | Definition |
| --- | --- |
| PLMN,<br>Visited PLMN,<br>Home PLMN,<br>hosting PLMN | A public land mobile network (PLMN) is a wireless communication system that provides communication signals through the use of land-based transmitters to a plurality of subscribed users.<br>A “Home PLMN” is a land based mobile communication system where the user is registered for service.<br>A “Visited PLMN” is a PLMN other than the Home PLMN, which currently accommodates cellular communication for a user registered for service on the Home PLMN.<br>Throughout this application, we have used the term “Hosting PLMN” to describe a PLMN which currently accommodates cellular communication for a user, regardless of the Home PLMN upon which the user is registered for service. |
| User Cellular Device(s) (UCD) | The term User Cellular Device(s) (UCD) is used throughout this application to describe user-end cellular appliances which utilize the hosting PLMN to connect to a cellular network.<br>It is to be made clear that the term UCD is used herein for the purpose of brevity, to describe any type of cellular appliance (e.g.: cellular phones, smartphones, tablet computers, laptop computers, IoT devices, M2M devices, connected cars etc.), connected by the hosting PLMN to a cellular network of any standard (e.g.: GSM, 3GPP, LTE). |
| Subscriber Identity Storage Element (SISE) | The term “Subscriber Identity Storage Element” (SISE) is used throughout this document to describe any type of element that stores parameters of the subscriber’s UCD identity (e.g.: IMSI, Ki, Kc).<br>The SISE may be implemented as Universal Integrated Circuit Card attached to the UCD (e.g. UICC, SIM card, USIM card) or as a module embedded within the UCD Hardware and Software (e.g. EUICC, ESIM). |
| Cellular Controlled Network (CCN) | A system designed to enhance the privacy of cellular subscribers of a hosting PLMN, and the security of data stored on their UCD.<br>The CCN comprises of one or more controlled modules (300, 350, 400, 500, 550, 800, 850). Each said controlled modules may be implemented as any combination of hardware and software (e.g. on dedicated machines or as services on the hosting PLMN machines).<br>For the purpose of clarification, the interface between the hosting PLMN and the CCN may be described as similar (but not identical) to the interface of a Mobile Virtual Network Operator (MVNO) network to a Mobile Virtual Network Enabler (MVNE) network.<br>This interface accommodates the flow of data between the hosting PLMN and the CCN, and enables the CCN to provide serviced subscribers at least part of the following functionality:<br>Mobility Management (MM) of the user;<br>Short Message Services (SMS);<br>Supplementary Services (SS);<br>Intelligent Networks (IN) aspects;<br>Handling user data communication;<br>Signaling of incoming calls and SMS;<br>Incoming and outgoing USSD; and<br>All CAMEL transactions.<br>The CCN encapsulates communication between the UCD and the hosting PLMN, analyzes this communication in respect to each serviced subscriber, and provides them with the said security services, as elaborated below. |

-continued

| Term | Definition |
| --- | --- |
| Serviced subscribers | A subset of subscribers of the hosting PLMN, for whom the CCN provides security services, according to predefined subscriber profiles. |
| Controlled modules | Modules comprising the CCN, each configured to complement the functionality of respective elements of the hosting cellular PLMN, and are configured, monitored and controlled by the Security center module [1000].<br>For example, the controlled SMSC module [400] complements the functionality of the SMSC module in cellular systems. It is responsible for routing Short Messages (SMS, EMS, MMS, USSD) between the CCN [100] and the hosting PLMN [200]. |
| Lifeline | A two-way communication channel between serviced subscribers' UCD and the security action management module (sub-module of the CCN). According to one embodiment, the Lifeline channel is implemented as switched packet data communication over the Internet, with SMS or USSD based communication fallback over the cellular hosting PLMN. Failure to receive Lifeline communication (on either the security action management module side or on the UCD side) may indicate an attempt to hijack the UCD to another network. |
| UCD Lifeline Module (ULM) | The UCD Lifeline Module (ULM) is optionally installed on serviced subscribers UCDs, and may be implemented by any combination of hardware and software (e.g. as a SIM applet or an application or service running in the UCD's background).<br>The ULM stores modules of instruction code which, when executed, configure the UCD to maintain a continuous two-way communication channel with the security action management module. |

A system/solution for protecting cellular mobile devices against cyber-attack. The system/solution includes the following:

The solution is aimed in providing the protection only to designated mobile subscribers which are listed to the protection service (not to all users or devices of the cellular network)

The cellular network data flow of the listed subscribers is configured so that the connectivity to the (possibly hostile) public PDN (i.e. to the Internet) is routed through a dedicated security GW. One possibility for achieving this is by using a dedicated APN to be installed on the protection service listed devices. Another possibility (generalization) is that the there are several such dedicated security GWs, each security server is allocated to certain sub-set of the protected subscribers—so that each such sub-set of devices is connected to the PDN through a another security GW. The clustering can be based on issues like: distinction of the applied security features of the sub-set, need of the relevant users to be separated for management and internal security reasons, scalability and processing power need, and more.

In the security GW (either single or several) several data protection features are applied, as further detailed bellow:

Destination based protection:

a. Each protected mobile device is member of a group (ad hoc, device type specific, usage type specific, device owner specific, etc.).
b. The individual protection is applied on two levels: personal and group.
c. The data protection features are implemented on virtualized computing entity (container) in swarm deployment.
d. The mobile subscriber address is assigned by the system upon network connection. A routing path through the container swarm (individual and group level) is established upon address assignment.
e. The security profiles defined for the subscriber and its group are applied to the nodes along the routing path and applied to data traversing in either direction along that path.
f. Access security rules for the data protection engines (subscriber and group level) are generated dynamically based on abstract rules e.g. destination IP geo-fence as well as static rules e.g. list of specific addresses, protocols, time etc.
g. The system may be connected to feeds of thread intelligence providers (public, commercial or private). The data retrieved from the feeds are validated and adopted to the system format. The threat intelligence feed source can be selected on individual and as well as group level.
h. The system provides means to bypass group level security rules for specific traffic on individual level e.g. allow specific application traffic despite prohibitive group rules.

DNS based protection a. The system supplies DNS services to the protected mobile devices (the devices listed to the protection service).
b. The usage of the designated DNS is enforced by a rule being part of the security profile defined for that subscriber. An attempt to bypass the designated DNS is notified and corrected if such rule exists on the subscriber security profile.
c. The system rebuilds a DNS cache individually for the subscriber based on the individual DNS traffic analyzed by the system. Device communication is been analyzed passively to determine whether the peer address was resolved through a DNS query or not. The system applies security rules (pass, alert/notify, block) based on this analysis.
d. DNS queries are escalated to verified service providers by secure (encrypted) protocol and the DNS query response is sanitized by the system.

Re-routing protection a. Option A: a SIM applet functionality is used to verify the data path between each protected individual device and the data protection system. This is achieved by establishing an independent network IP connectivity from the SIM applet to the security system (e.g. BIP connectivity), and verifying that this connectivity is handled through the designated security GW.

b. Option B: Alternatively, the absence of communication from the subscriber through the security GW for a long time is considered suspicious.

c. Deviations are considered as suspicious and notified to the device owner/operator and/or its organization.

d. By path protection

FIG. 1 illustrate a block diagram, depicting the messaging security platform, according to prior art.

Figure 2:
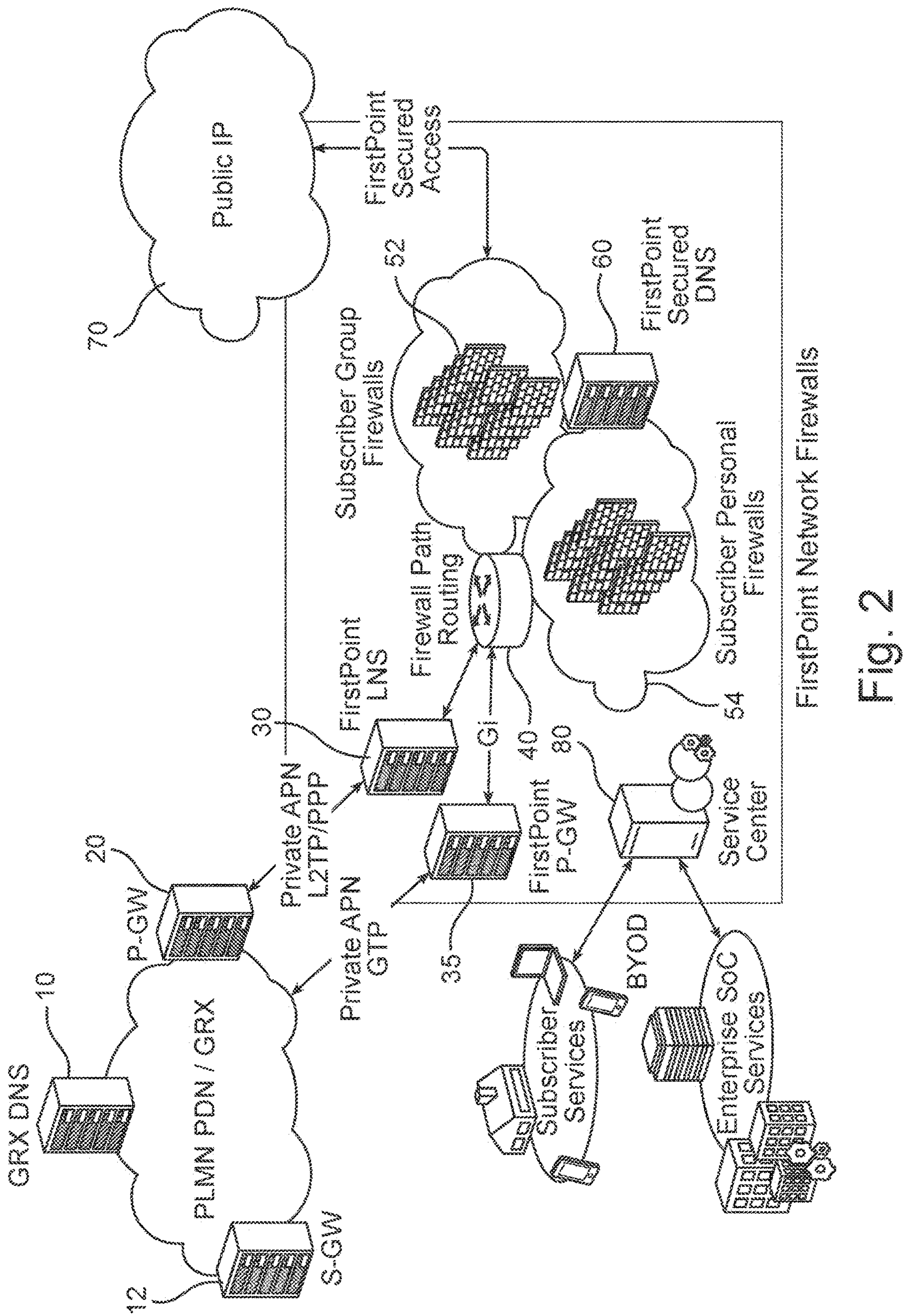
FIG. 2 illustrate a block diagram depicting the messaging security platform, according to some embodiments of the present invention.

FIG. 2 illustrate a block diagram depicting the messaging security platform, according to some embodiments of the present invention.

The messaging security platform is comprised of data domain protection consisting of group and personal firewalls nodes 52, 54, which check the user messages requests which are delivered from user though PLMN/PDN/GRX network, using PGW 20 and/or designated PGW 35, or Designated LNS, which routs the messages to customized/personalized path (using firewall path routing (4).

Figure 3:
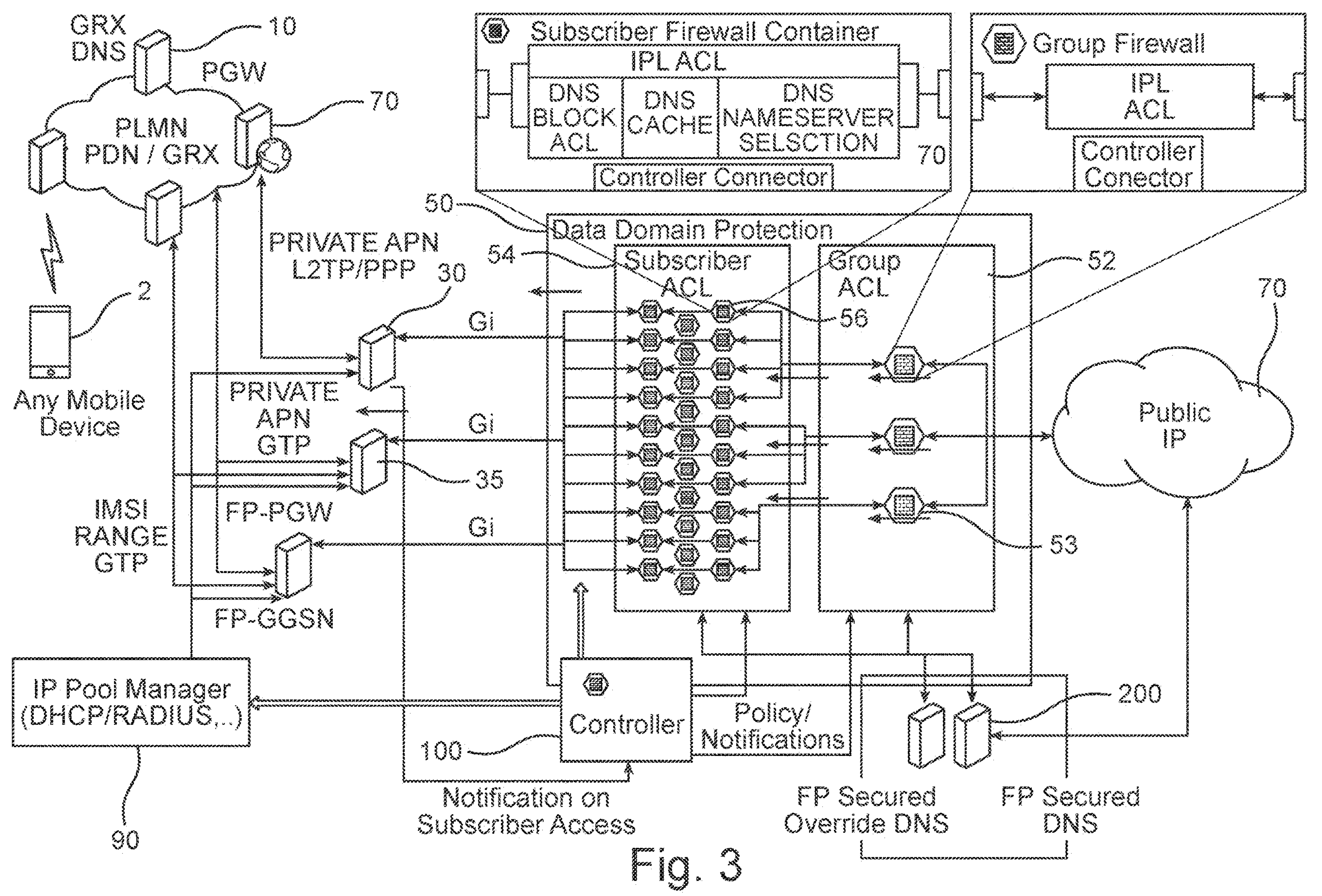
FIG. 3 illustrate a block diagram, depicting the messaging security platform, according to some embodiments of the present invention.

FIG. 3 illustrate a block diagram, depicting the messaging security platform, according to some embodiments of the present invention.

The messaging security platform is comprised of data domain protection consisting of group and personal firewalls nodes 52, 54, which check the user messages requests which are delivered from user though PLMN/PDN/GRX network, using PGW 20 and/or designated PGW 35, or Designated LNS, which routs the messages to customized/personalized path (using firewall path routing (4).

The personal and group fire wall nodes are arranged in a graph structure of multiple nodes 56 and 53 respectively, each node including specific rules. By specifying a path through the graph structure are determined sequence of rules a specific request of user is tested by.

Controller 100 identifies client profile and associated groups Managing the address assigned to each of the UCD and determines personal/customized rules, the groups are either pre-defined or created ad hoc or based on user profiles for applying destination-based protection which is customized to user profile and group.

The IP poll manager manages the address assigned to each of the UCD.

Figure 4:
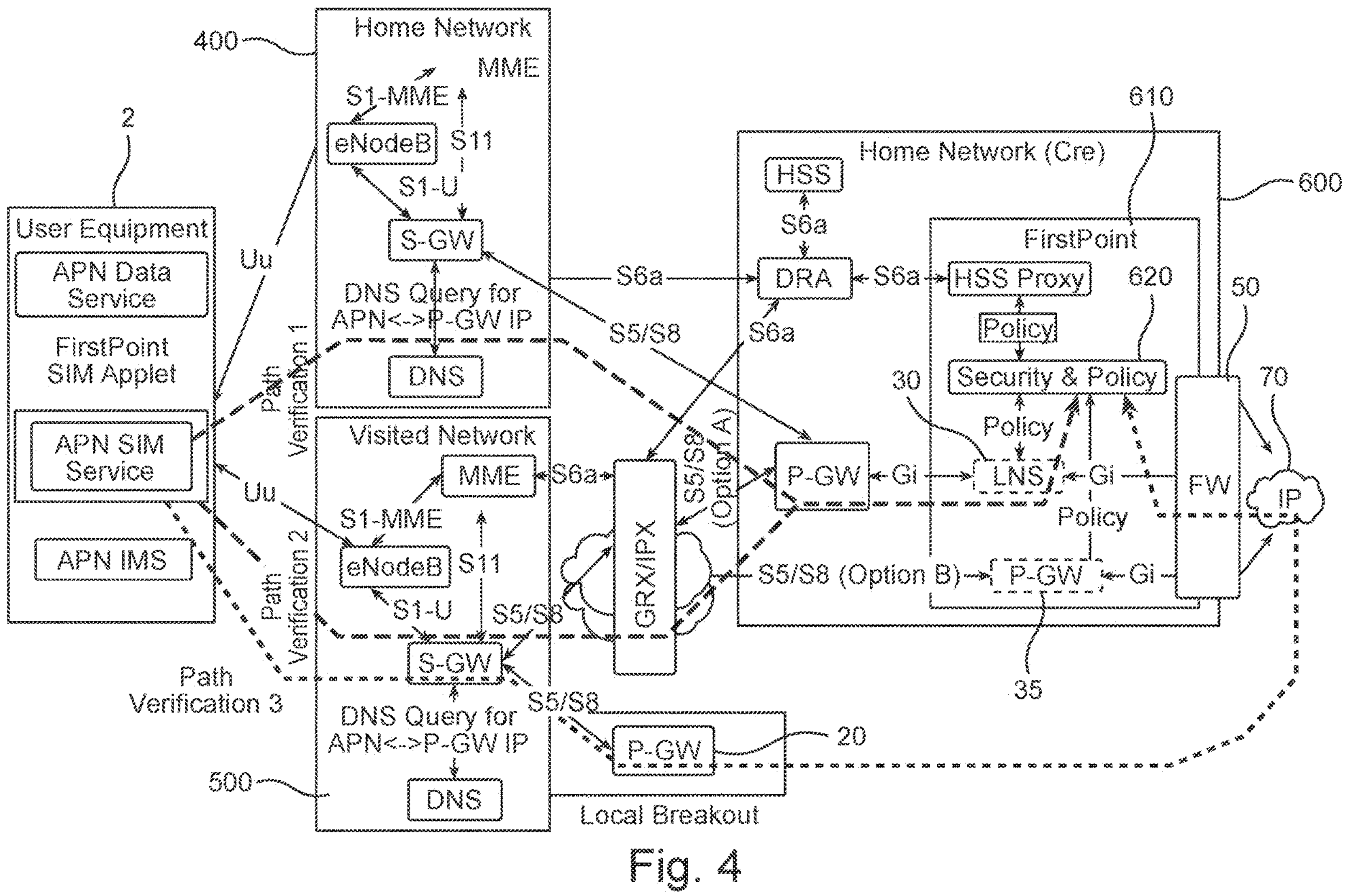
FIG. 4 is a block diagram which depicts depicting the messaging security platform, including option of visited network according to some embodiments of the present invention.

FIG. 4 is a block diagram which depicts depicting the messaging security platform, including option of visited network according to some embodiments of the present invention.

The is diagram show different information flow of the message routing in different network configuration of equivalent functionality with different system owner (service provider or designated security service provided based present invention technology Path Verification 1 of one possible configuration disclose using designated security SIM applet, which communicates with the Security & Policy function either on the PDN of the home network.

Path Verification 2 of one possible configuration disclose using designated security SIM applet, which communicates with the Security & Policy function on the PDN of GSMA regulated infrastructure.

Path Verification 3: designated security SIM applet communicates with the Security & Policy function via hostile internet, in which the communication is routed through unknown server.

All communication paths end at the home networker core, which implements the security platform 106 as suggested by the present invention, which include the security policy as suggested by the present invention See FIG. 10 for information flow for this block diagram.

Figure 5A:
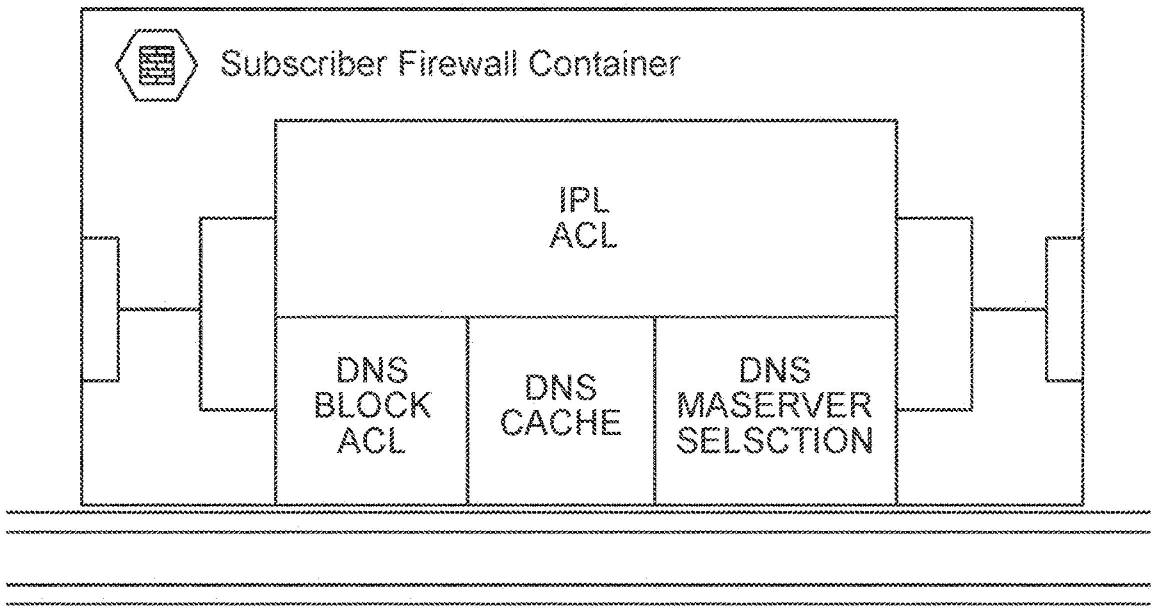
FIGS. 5A & B is a block diagram which configuration of subscriber and group firewalls according to some embodiments of the present invention.
Figure 5B:
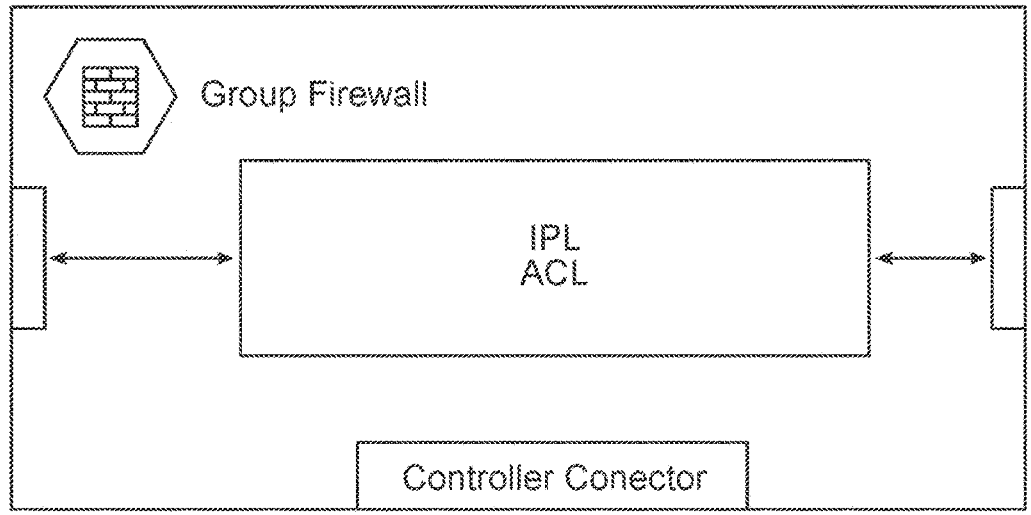

FIGS. 5A & B is a block diagram which configuration of subscriber and group firewalls according to some embodiments of the present invention.

Figure 6:
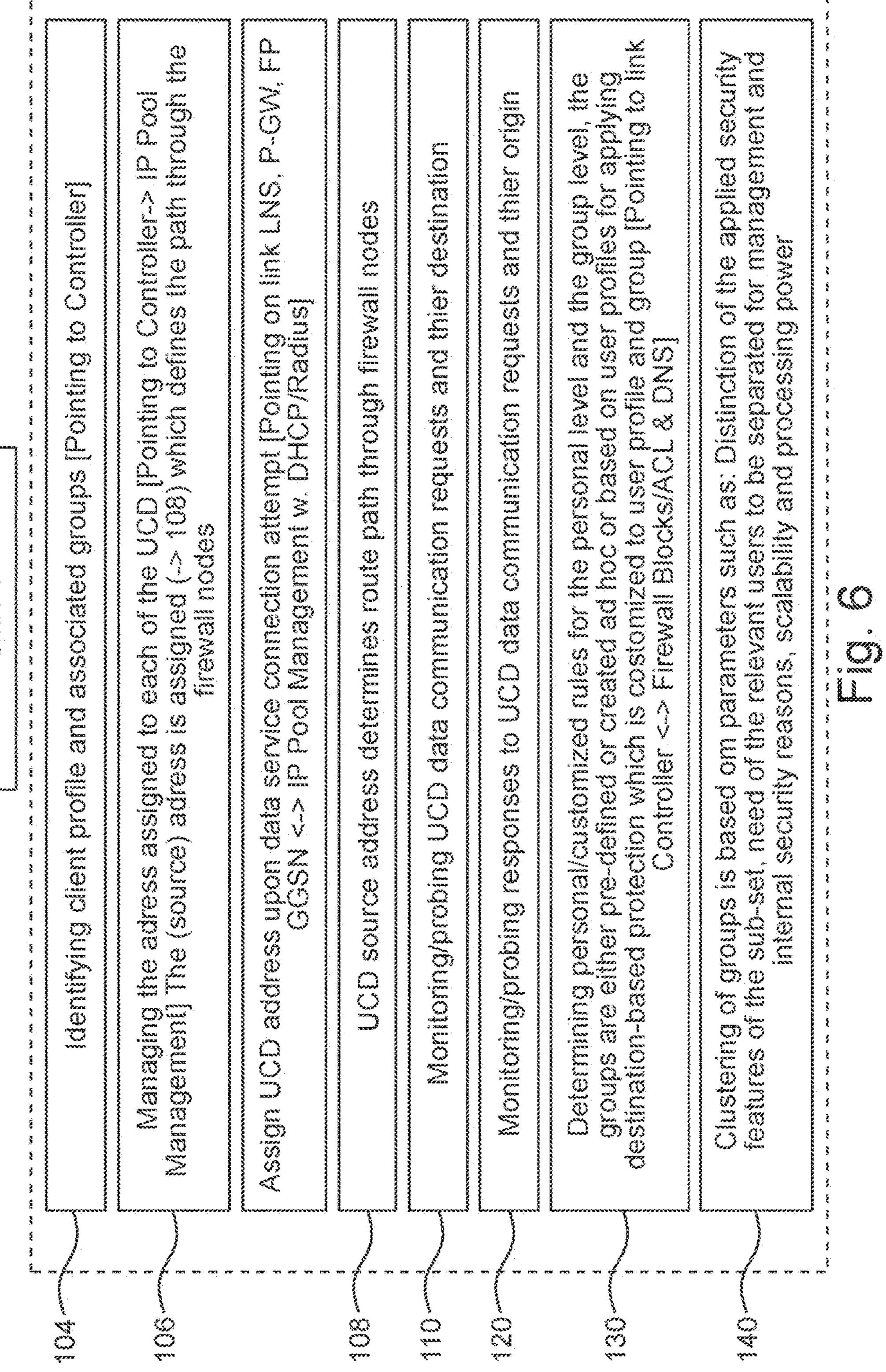
FIG. 6 is a flow diagram of routing secured message according to the configuration of FIG. 3, according to some embodiments of the present invention.

FIG. 6 is a flow diagram of routing of secured message according to the configuration of FIG. 3, according to some embodiments of the present invention.

The routing of secured message includes at least one of the following steps:

Identifying client profile and associated groups by Controller 104;

Managing the address assigned to each of the UCD by the Controller 100 using IP Pool Management 106

Assign UCD address upon data service connection attempt by the IP pool management module [Pointing on link LNS, P-GW, FP GGSN↔IP Pool Management w. DHCP/Radius???)

determines the route path through firewall nodes is determined by UCD the source address 108

Monitoring/probing UCD data communication requests and their destination 110

Monitoring/probing responses to UCD data communication requests and their origin 120;

Determining by the controller personal/customized rules for the personal level and the group level, the groups are either pre-defined or created ad hoc or based on user profiles for applying destination-based protection which is customized to user profile and group [Pointing to link Controller↔Firewall Blocks/ACL & DNS] 130

Clustering of groups is based on parameters such as: Distinction of the applied security features of the sub-set, need of the relevant users to be separated for management and internal security reasons, scalability and processing power ['Layout' of the blue/green areas]

FIG. 7 is a flow diagram of the action performed by the firewall instance, according to some embodiments of the present invention.

The firewall processing includes at least one of the following steps:

Data is retrieved from threat intelligence feeds, updated as needed, validated and adapted to system format access rules. 208

Access/security rules for the data protection engines (subscriber and group level) are generated dynamically based on abstract rules, e.g. Destination IP geo-fence as well as static rules e.g. list of specific addresses, threat intelligence data, protocols, time etc. 210

Applying security rules relevant for user ID profile and associated group by tracing the rules at each firewall node and DNS; 212

Figure 8:
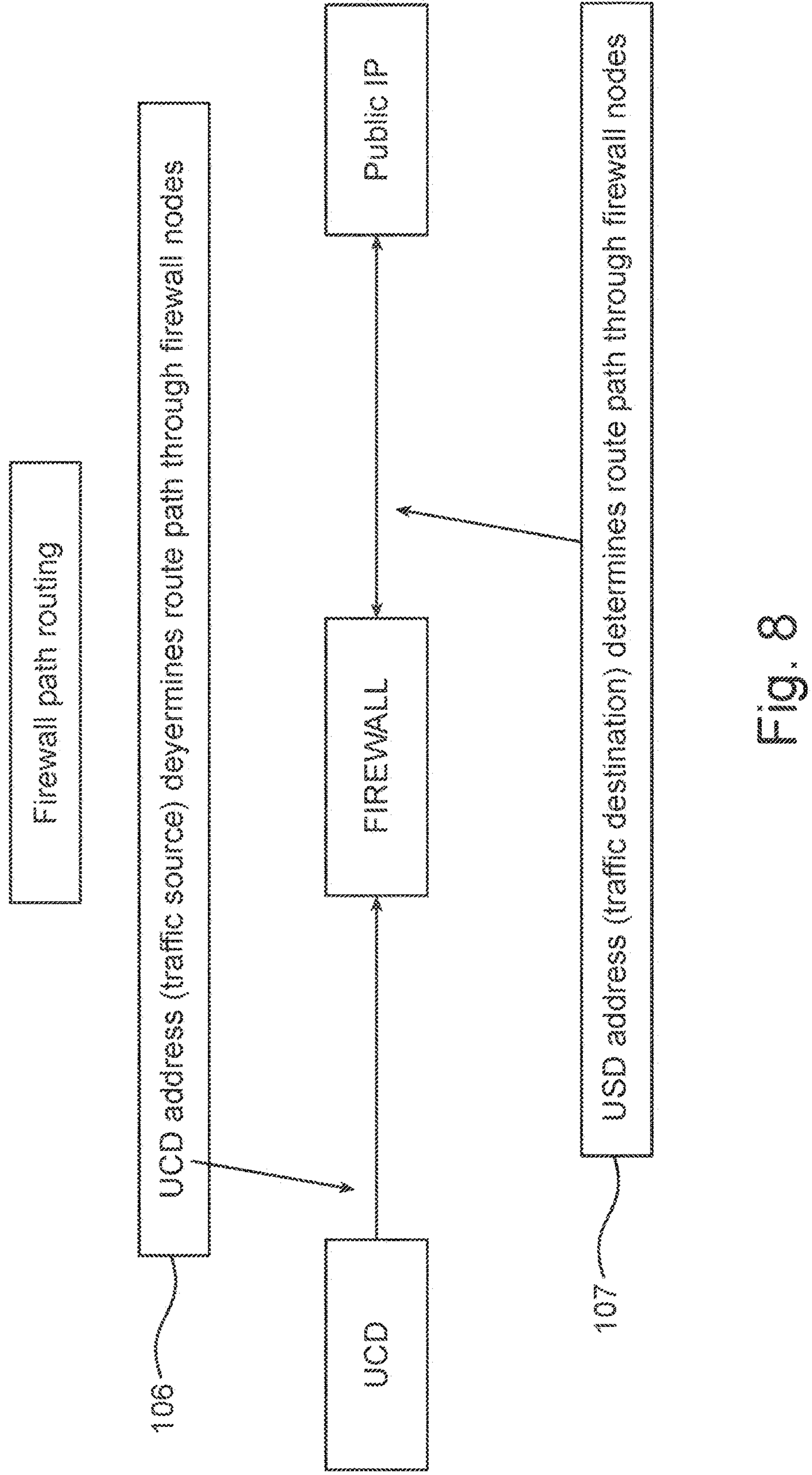
FIG. 8 is a flow diagram of firewall path routing, according to some embodiments of the present invention.

Tracing DNS queries per UCD and Sanitizing DNS query responses against threat intelligence data and other parametric 214;

Re-building DNS cache of UCD: Device communication is been analyzed to determine whether the peer address was resolved through a DNS query or not. The system applies security rules (pass, alert/notify, block) based on this analysis, 216;

Usage of the designated DNS is enforced by a rule being part of the security profile defined for that subscriber. An attempt to bypass the designated DNS is notified and corrected if such rule exists on the subscriber security profile 218;

Possibility to bypass group level security rules for specific; allow specific traffic despite prohibitive group rules 220;

FIG. 8 is a flow diagram of firewall path routing, according to some embodiments of the present invention.

According to this flow the route path through firewall nodes is determined based on UCD source address.

Figure 9:
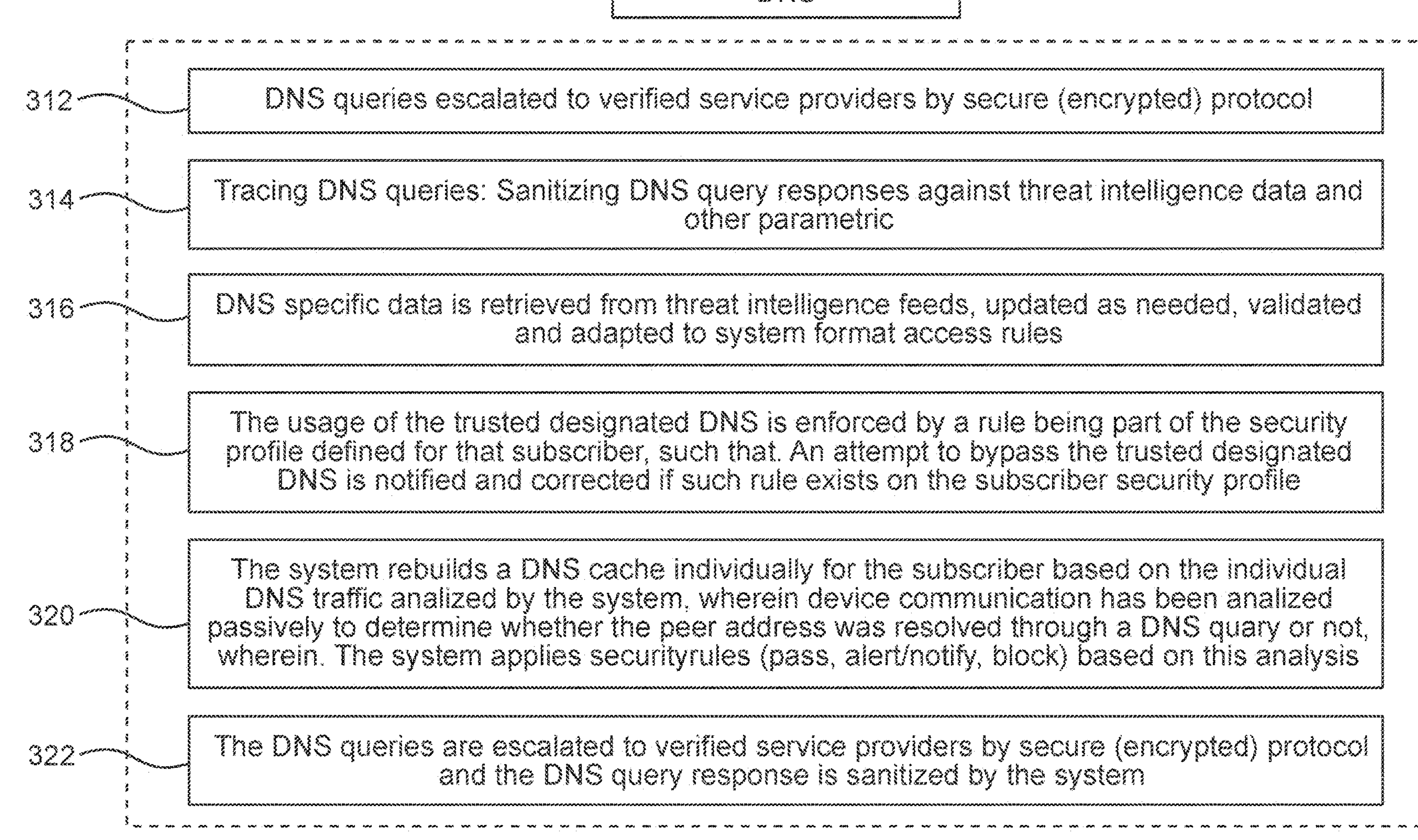
FIG. 9 is a flow diagram of the action performed by the DNS, according to some embodiments of the present invention.

FIG. 9 is a flow diagram of the action performed by the DNS, according to some embodiments of the present invention.

The actions performed by the DNS include at least one of the following steps:

- DNS queries are escalated to verified service providers by secure (encrypted) protocol 312;
- Tracing DNS queries; Sanitizing DNS query responses against threat intelligence data and other parametric 314;
- DNS specific data is retrieved from threat intelligence feeds, updated as needed, validated and adapted to system format access rules. 316

The usage of the designated DNS is enforced by a rule being part of the security profile defined for that subscriber, such that. An attempt to bypass the designated DNS is notified and corrected if such rule exists on the subscriber security profile. 318

The system rebuilds a DNS cache individually for the subscriber based on the individual DNS traffic analyzed by the system, wherein. Device communication is been analyzed passively to determine whether the peer address was resolved through a DNS query or not, wherein. The system applies security rules (pass, alert/notify, block) based on this analysis. 320

- the DNS queries are escalated to verified service providers by secure (encrypted) protocol and the DNS query response is sanitized by the system. 322

FIG. 10 is a flow diagram of re-routing of secured message protection according to the configuration of FIG. 4, according to some embodiments of the present invention.

The re-routing of secured message protection comprises at least one of the following steps:

- Option A: A SIM applet functionality is used to verify the data path between each protected individual device and the data protection system. 410
- SIM applet establishes IP connection to the security system 412
- Security system verifies that SIM applet connectivity is handled through the designated security GW [red or green path] 414
- Option B: The absence of communication from the UCD through the security GW for a long time is considered suspicious. 416
- Deviations are considered as suspicious and notified to the device owner/operator and/or its organization 418

Figure 11:
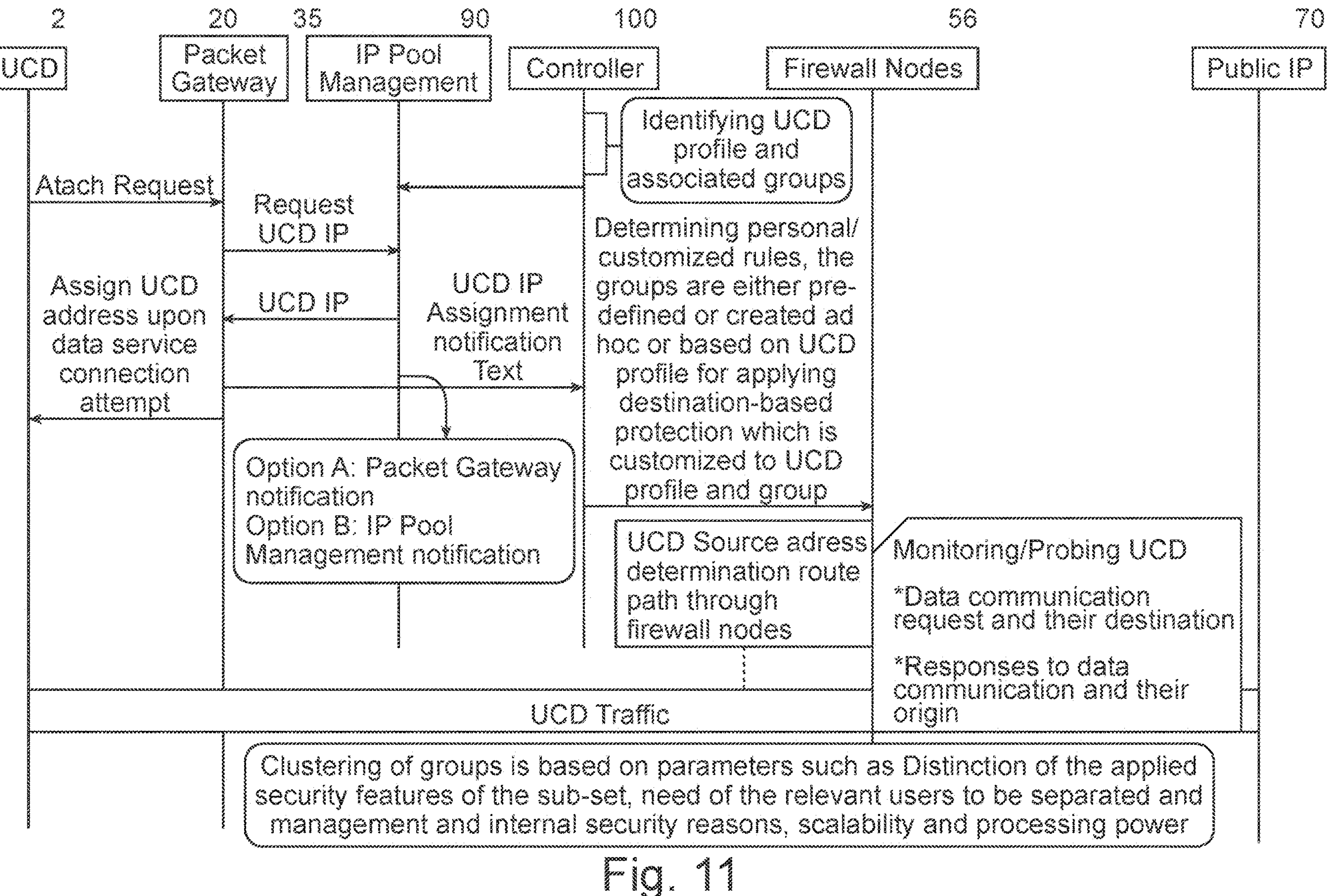
FIG. 11 is a flow diagram of routing secured message according to the configuration of FIG. 3, according to some embodiments of the present invention.

FIG. 11 is a flow diagram of routing secured message according to the configuration of FIG. 3, according to some embodiments of the present invention.

Figure 12:
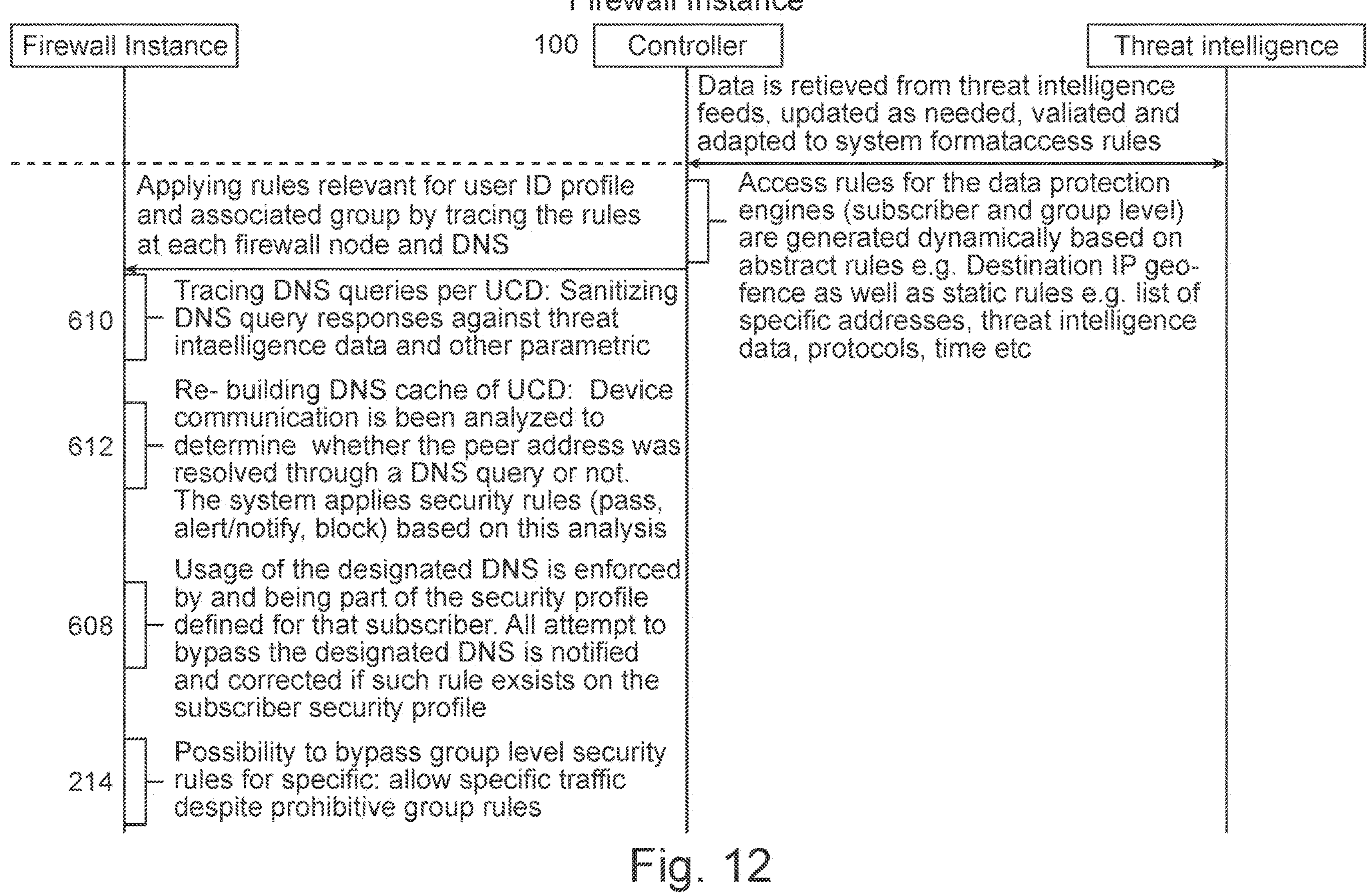
FIG. 12 is a flow diagram of firewall path routing and controller actions, according to some embodiments of the present invention.

The routing of secured message comprises at least one of the following steps:

- Sends, Attach Request from the USD 2 to the packet gateway (20,35), Request UCD IP from the IP poll management (90), based on received UCD IP, assign UCD Address upon service connection;
- Identifying UCD profile and associated groups, by the controller 100 and
- Determining personal/customized rules, the groups are either pre-defined or created ad hoc or based on UCD profile for applying destination-based protection which is customized to UCD profile and group;
- The UCD Source address determines route path through firewall nodes;
- Monitoring/Probing UCD communication including: Data communication request and their destination, Responses to data communication and their origin;
- Clustering of groups is based on parameters such as: Distinction of the applied security features of the sub-set, need of the relevant users to be separated and management and internal security reasons, scalability and processing power.
- Option A: Packet Gateway notification
- Option B: IP Pool Management notification
- Option A: Packet Gateway notification
- Option B: IP Pool Management notification FIG. 12 is a flow diagram of firewall path routing and controller actions, according to some embodiments of the present invention.

The firewall path routing and controller actions comprise at least one of the following steps:

- Applying rules relevant for user ID profile and associated group by tracing the rules at each firewall node and DNS;
- Tracing DNS queries per UCD; Sanitizing DNS query responses against threat intelligence data and other parametric 210;
- Re-building DNS cache of UCD: Device communication is been analyzed to determine whether the peer address was resolved through a DNS query or not. The system applies security rules (pass, alert/notify, block) based on this analysis. 612
- Usage of the designated DNS is enforced by a rule being part of the security profile defined for that subscriber. An attempt to bypass the designated DNS is notified and corrected if such rule exists on the subscriber security profile 608
- Possibility to bypass group level security rules for specific; allow specific traffic despite prohibitive group rules 214
- Data is retrieved from threat intelligence feeds, updated as needed, validated and adapted to system format access rules;
- Access rules for the data protection engines (subscriber and group level) are generated dynamically based on abstract rules e.g. Destination IP geo-fence as well as static rules e.g. list of specific addresses, threat intelligence data, protocols, time etc.

DNS specific data is retrieved from threat intelligence feeds, updated as needed, validated and adapted to system format access rules.

Figure 13:
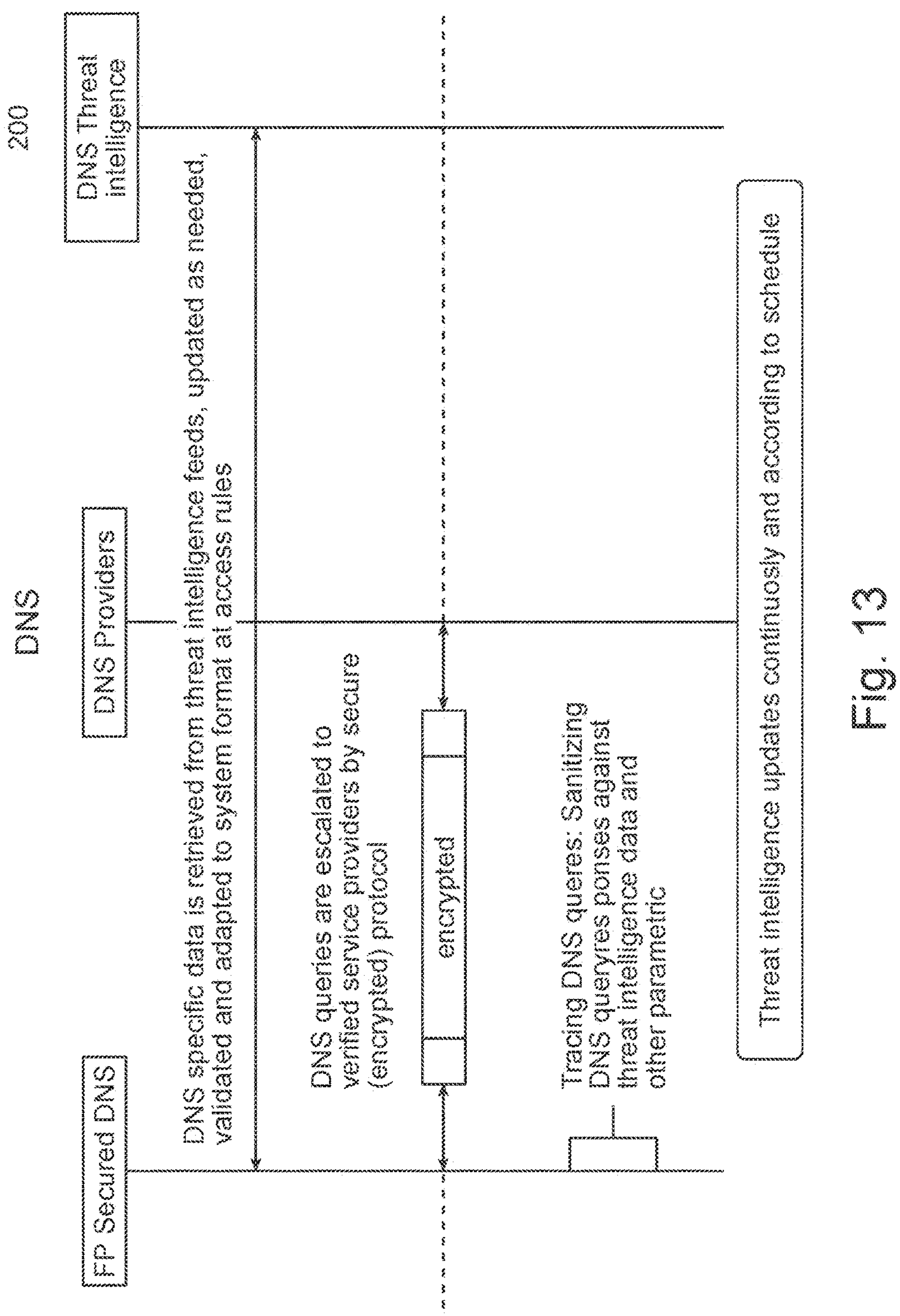
FIG. 13 is a flow diagram of the action performed by the DNS, according to some embodiments of the present invention
Figure 14:
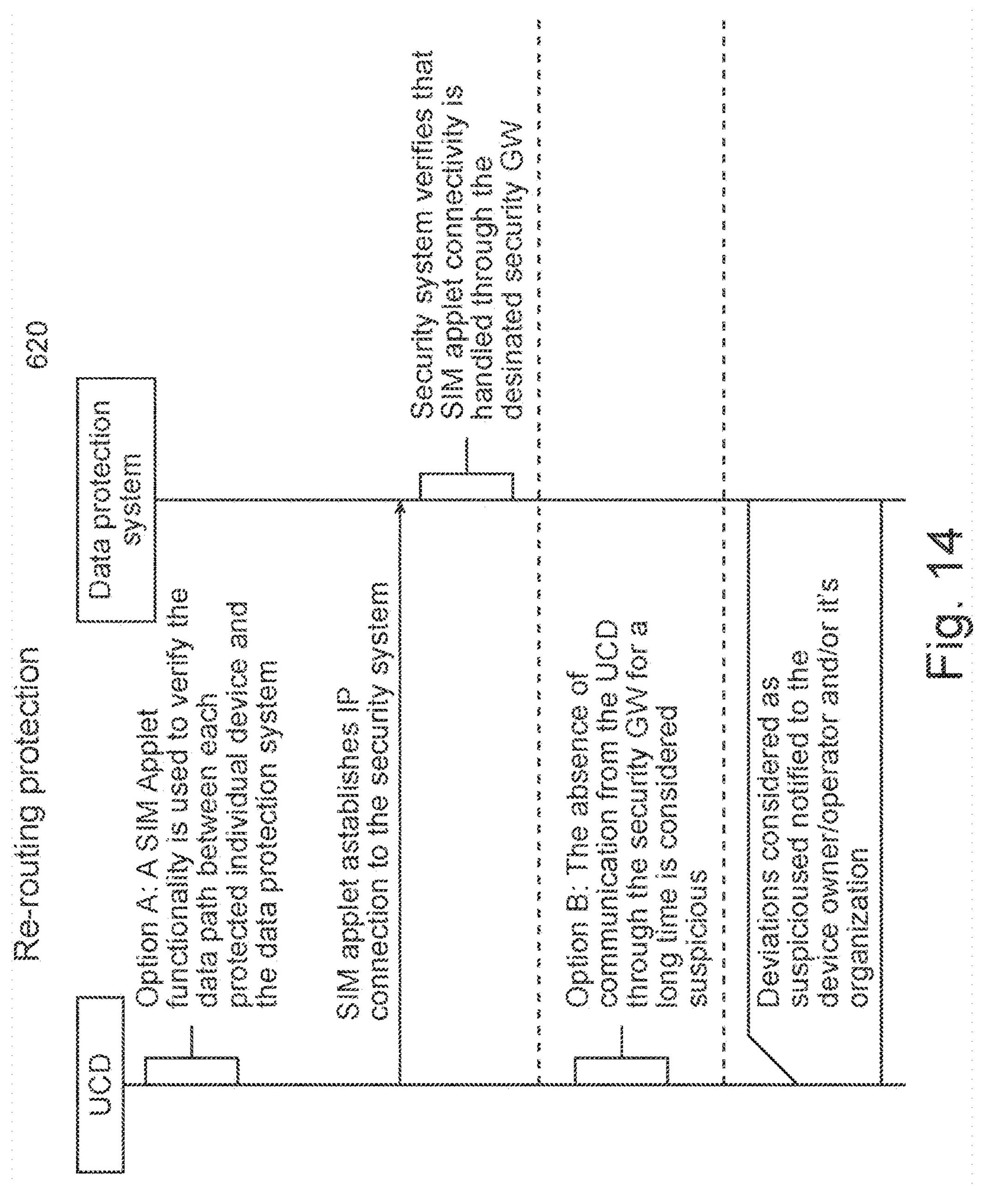
FIG. 14 is a flow diagram of routing secured message action between the UCD and the data protection system according to the configuration of FIG. 3, according to some embodiments of the present invention.

DNS queries are escalated to verified service providers by secure (encrypted) protocol Tracing DNS queries; Sanitizing DNS query responses against threat intelligence data and other parametric FIG. 13 is a flow diagram of the action performed by the DNS, according to some embodiments of the present invention Option A: Packet Gateway notification Option B: IP Pool Management notification DNS queries are escalated to verified service providers by secure (encrypted) protocol Tracing DNS queries; Sanitizing DNS query responses against threat intelligence data and other parametric Threat intelligence updates continuously and according to schedule FIG. 14 is a flow diagram of routing secured message action between the UCD and the data protection system according to the configuration of FIG. 3, according to some embodiments of the present invention.

The routing secured message action between the UCD and the data protection system, comprise one if the following steps:

Option A: A SIM applet functionality is used to verify the data path between each protected individual device and the data protection system.

SIM applet establishes IP connection to the security system

Security system verifies that SIM applet connectivity is handled through the designated security GW Option B: The absence of communication from the UCD through the security GW for a long time is considered suspicious.

Deviations are considered as suspicious and notified to the device owner/operator and/or its organization.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitably operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein. in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for securing the data communication of cellular network subscribers using a security service, said method comprising:

associating subscribers listed to the security service with a group;

configuring the cellular network connectivity to the public PDN with at least one security GW, such that data flow of the subscribers listed to the security service is routed through the at least one security GW;

applying a plurality of security rules comprising group related rules and individual related rules associated with by at least one the security GW, wherein the security rules are configured for inspecting the data communication and determining if to block or allow the data communication;

wherein the plurality of the security rules applied in the security GW are implemented in two layers: a first layer which is determined by the individual identity of the subscriber and a second layer which is based on the group to which the subscriber is associated;

applying the plurality of security rules relevant for user ID profile and associated group by tracing the rules at each firewall node;

wherein the security rules are implemented on virtualized computing entities (containers) in a swarm deployment of firewall nodes;

wherein a mobile subscriber address is assigned by the system upon network connection, and a dedicated routing path through the container swarm, at both individual and group level, is established upon address assignment; and wherein the security profiles defined for the subscriber and its group are applied to the firewall nodes along said routing path and applied to data traversing in either direction along that path.

2. The method of claim 1 wherein the group association for subscriber is determined dynamically, based the communication pattern of the subscriber.

3. The method of claim 1 wherein the group association per subscriber is determined a-priory based on the identity of the subscriber or device type specific or device owner specific, usage type.

4. The method of claim 1 wherein the security rules associated with group and/or individual rules for the data protection engines (subscriber/individual and group level) are generated dynamically based on abstract rules including at least one of destination IP geo-fence, and/or static rules including at least one of list of specific addresses, protocols, time.

5. The method of claim 1 in which the security GW is connected to feeds of threat intelligence providers wherein the data retrieved from the feeds are validated and adapted to the system format, wherein the threat intelligence feed source can be selected on individual and as well as group level.

6. The method of claim 1 wherein the Security rules applied at the group layer are bypassed for specific individual rules.

7. The method of claim 1, in which DNS based protection is applied by supplying DNS services to the devices listed to the protection service;

wherein the usage of the designated DNS is enforced by a rule being part of the security profile defined for that subscriber, such that an attempt to bypass the designated DNS is notified and corrected if such rule exists on the subscriber security profile.

8. The method of claim 6 wherein the system rebuilds a DNS cache individually for the subscriber based on the individual DNS traffic analyzed by the system, wherein device communication is analyzed passively to determine whether the peer address was resolved through a DNS query, wherein the system applies security rules including at least one of pass, alert/notify, block.

9. The method of claim 6 wherein the DNS queries are escalated to verified service providers by secure (encrypted) protocol and the DNS query response is sanitized by the system.

10. The method of claim 1, in which re-routing detection and protection is applied, by using a SIM applet functionality for verifying the data path between each protected individual device and the data protection system, wherein the functionality is achieved by establishing an independent network IP connectivity from the SIM applet to the security system (e.g. BIP connectivity), and verifying that this connectivity is handled through the designated security GW.

11. The method of claim 1, in which re-routing detection and protection is applied by detecting absence of communication from the subscriber through the security GW for above a predefined time period.

12. A system for securing the data communication of cellular network subscribers using a security service, said system comprised of:

a controller configured for identifying client profile and associated groups, managing the address assigned to each of the UCD and determining personal/customized rules;

at least one security GW for configuring the cellular network connectivity to the public PDN with, such that data flow of the subscribers listed to the security service is routed through the at least one security GW;

group and personal firewalls for a applying plurality of security rules comprising group related rules and individual related rules associated with by at least one the security GW, wherein the security rules are configured for inspecting the data communication and determining if to block or allow the data communication;

wherein the plurality of the security rules applied in the security GW are implemented in two layers: a first layer which is determined by the individual identity of the subscriber and a second layer which is based on the group to which the subscriber is associated;

applying the plurality of security rules relevant for user ID profile and associated group by tracing the rules at each firewall node;

wherein the security rules are implemented on virtualized computing entities (containers) in a swarm deployment of firewall nodes;

wherein a mobile subscriber address is assigned by the system upon network connection, and a dedicated routing path through the container swarm, at both individual and group level, is established upon address assignment; and wherein the security profiles defined for the subscriber and its group are applied to the firewall nodes along said routing path and applied to data traversing in either direction along that path.

13. The system of claim 12 wherein the group association for subscriber is determined dynamically, based the communication pattern of the subscriber.

14. The system of claim 12 wherein the group association per subscriber is determined a-priory based on the identity of the subscriber or device type specific or device owner specific, usage type.

15. The system of claim 12 wherein the security rules associated with group and/or individual rules for the data protection engines (subscriber/individual and group level) are generated dynamically based on abstract rules including at least one of destination IP geo-fence, and/or static rules including at least one of list of specific addresses, protocols, time.

16. The system of claim 12 in which the security GW is connected to feeds of threat intelligence providers wherein the data retrieved from the feeds are validated and adapted to the system format, wherein the threat intelligence feed source can be selected on individual and as well as group level.

17. The system of claim 12, in which DNS based protection is applied by supplying DNS services to the devices listed to the protection service ("protected mobile devices");

wherein the usage of the designated DNS is enforced by a rule being part of the security profile defined for that subscriber, such that an attempt to bypass the designated DNS is notified and corrected if such rule exists on the subscriber security profile.

18. The system of claim 12 wherein the system rebuilds a DNS cache individually for the subscriber based on the individual DNS traffic analyzed by the system, wherein device communication is analyzed passively to determine whether the peer address was resolved through a DNS query, wherein the system applies security rules including at least one of pass, alert/notify, block.

19. The system of claim 18 wherein the DNS queries are escalated to verified service providers by secure (encrypted) protocol and the DNS query response is sanitized by the system.

20. The system of claim 12, in which the re-routing detection and protection is applied, by using a SIM applet functionality for verifying the data path between each protected individual device and the data protection system, wherein the functionality is achieved by establishing an independent network IP connectivity from the SIM applet to the security system (e.g. BIP connectivity), and verifying that this connectivity is handled through the designated security GW.

21. The system of claim 12, in which re-routing detection and protection is applied by detecting absence of communication from the subscriber through the security GW for above a predefined time period.

22. The system of claim 12 wherein the security rules applied at the group layer are bypassed for specific individual rules.

* * * * *